United States Patent Office 3,461,198
Patented Aug. 12, 1969

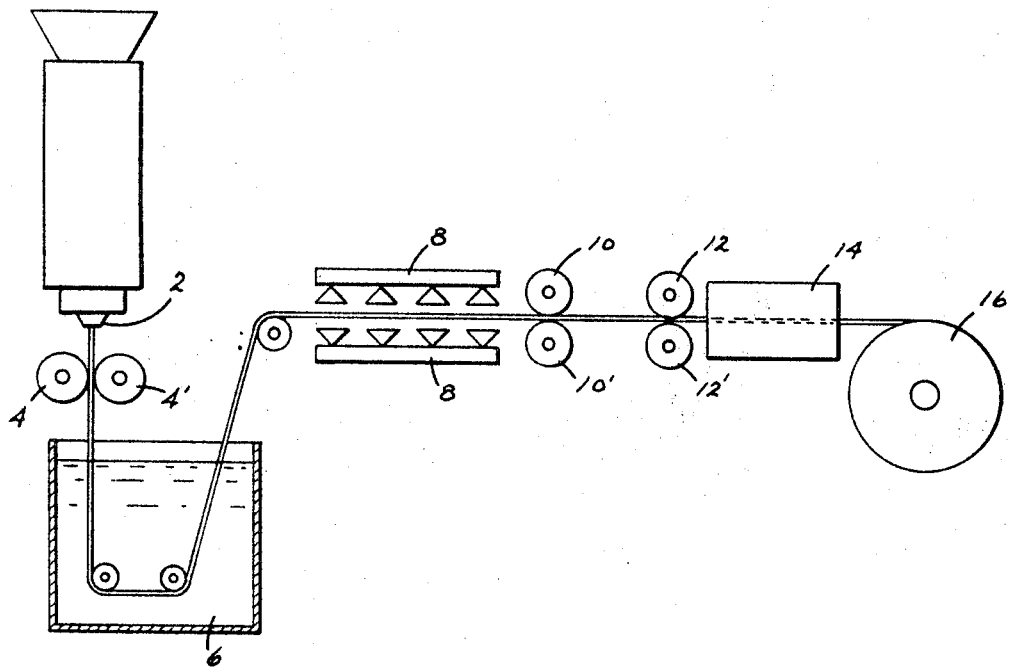

1

3,461,198
METHOD OF PREPARING UNIAXIALLY ORIENTED, FLAT PROPYLENE-ETHYLENE COPOLYMER ARTICLES
Daniel J. Ryan, Chester, Pa., and John J. Armstrong, Jr., Pennsauken, N.J., assignors to FMC Corporation, Philadelphia, Pa., a corporation of Delaware
Filed May 27, 1965, Ser. No. 459,175
Int. Cl. D01d 5/10, 5/12; D01f 7/06
U.S. Cl. 264—178                                   3 Claims

ABSTRACT OF THE DISCLOSURE

A uniaxially oriented, high tenacity packaging strap comprising a resinous, substantially isotactic copolymer of at least 95 wt. percent of propylene and at least 0.5 wt. percent ethylene, and a method for its manufacture, are disclosed herein.

---

Flat, uniaxially oriented articles of isotactic polypropylene resin, having a thickness of at least 10 mils, particularly package strapping or tape used for unitizing bundles have a tendency to split in the longitudinal or oriented direction when the article is folded or creased. This tendency does not affect the tensile strength of the article, but it does detract from the marketability thereof.

Another problem for packaging tape of this type arises with the use of fasteners or buckles of metal or other rigid material in joining the ends of the tape around a package. When a twisting force is applied to the tape there is some tendency for the tape to tear at the fastener.

It is an object of this invention to provide a uniaxially oriented, flat isotactic polypropylene article having reduced transverse brittleness.

It is another object of this invention to provide a uniaxially oriented isotactic polypropylene packaging tape having reduced transverse brittleness and a reduced tendency to tear transversely.

It is another object to provide a method of preparing a high tenacity isotactic polypropylene flat, elongated article having reduced transverse brittleness.

These and other objects are accomplished in accordance with this invention which comprises a flat, uniaxially oriented article having a uniform thickness of at least 10 mils and comprising the resinous, substantially isotactic copolymer of at least 95 wt. percent of propylene with at least 0.5 wt. percent of ethylene.

The use of the described copolymer provides flat, uniaxially oriented articles of at least a thickness of 10 mils which have greatly reduced transverse brittleness and high tensile strength. Prior attempts at accomplishing this result have succeeded with the use of polymer blends, however, the articles produced had decreased ultimate tensile strength.

The preferred article of this invention is a uniaxially oriented packaging tape having a thickness of from 10 up to about 50 mils and comprising the resinous, substantially isotactic copolymer of about 98 wt. percent propylene with about 2 wt. percent of ethylene.

The present invention also includes a method of making improved flat, uniaxially oriented polypropylene articles comprising melt extruding a resinous, substantially isotactic copolymer of at least 95 wt. percent of propylene

2 with at least about 0.5 wt. percent of ethylene through a rectangular orifice, cooling the extruded material, and thereafter longitudinally stretching the extruded material at a draw ratio of from about 8 to about 12. The "draw ratio" indicates the multiple of length that the strap is stretched compared to the original length. This stretching operation produces a strap which is oriented in the longitudinal direction and substantially unoriented in the transverse direction.

In a preferred method, as shown in FIG. 1 of the drawing, a resinous, substantially isotactic copolymer of about 98 wt. percent of propylene with about 2 wt. percent of ethylene is melt extruded through a rectangular orifice 2, the extruded article quenched by passing between a pair of cold rolls 4 and 4′ cooled by passing it through a cooling water bath 6, heated to a temperature between about 140° and 300° F., preferably between 180 and 230° F. at 8, stretched at a draw ratio of from about 9 to about 11 between draw roll pairs 10–10′ and 12–12′, cooled in zone 14 and then rolled up at 16.

Another advantage of the present invention is that a flat article, for example a tape, may be freed of the tendency to tear transversely under adverse conditions if the article is of the prescribed copolymer composition and it is stretched to a draw ratio of about 11 or over.

We claim:
1. A method of making an improved flat, uniaxially oriented polypropylene article which comprises melt extruding a resinous, substantially isotactic copolymer of at least 95 wt. percent of propylene and at least about 0.5 wt. percent of ethylene through a rectangular orifice, cooling the extruded material, and thereafter longitudinally stretching the extruded material at a draw ratio of from about 8 to about 12 whereby said article has a finished thickness of from about 10 up to about 50 mils.

2. A method of making a uniaxially oriented polypropylene packaging tape which comprises melt extruding a resinous, substantially isotactic copolymer of about 98 wt. percent of propylene and about 2 wt. percent of ethylene through a rectangular orifice, quenching the extruded article by passing it between a pair of cold rolls, cooling the article by passing it through a cooling water bath, then heating the article to a temperature between about 140° and 300° F., stretching the article at a draw ratio of from about 9 to about 11, whereby said article has a finished thickness of from about 10 up to about 50 mils and cooling the article.

3. The method of claim 2 wherein the article is heated to a temperature between 180° and 230° F. and stretched at a draw ratio of about 11.

References Cited

UNITED STATES PATENTS

| 3,290,420 | 12/1966 | Orser | 264—210 |
| 3,320,225 | 5/1967 | Bradbury | 264—210 |
| 3,354,023 | 11/1967 | Dunnington et al. | 264—210 |
| 3,222,191 | 12/1965 | Steiner et al. | 264—176 |
| 3,324,217 | 6/1967 | Armstrong et al. | 264—178 |
| 3,374,213 | 3/1968 | Hoeg. | |

ROBERT F. WHITE, Primary Examiner

J. R. THURLOW, Assistant Examiner

U.S. Cl. X.R.
264—210, 288